United States Patent
Huang et al.

(10) Patent No.: US 7,201,885 B1
(45) Date of Patent: Apr. 10, 2007

(54) METHOD OF REMOVING HEAVY METALS FROM SILICATE SOURCES DURING SILICATE MANUFACTURING

(75) Inventors: Yung-Hui Huang, Bel Air, MD (US); John V. Offidani, Havre de Grace, MD (US)

(73) Assignee: J.M. Huber Corporation, Edison, NJ (US)

( * ) Notice: Subject to any disclaimer, the term of this patent is extended or adjusted under 35 U.S.C. 154(b) by 23 days.

(21) Appl. No.: 11/282,073

(22) Filed: Nov. 17, 2005

(51) Int. Cl.
  *A62D 3/00* (2006.01)
  *C01B 33/20* (2006.01)

(52) U.S. Cl. ............... 423/326; 423/328.1; 423/328.2; 423/331; 423/332; 423/335; 588/315; 588/412

(58) Field of Classification Search ............... 423/326, 423/328.1, 328.2, 331, 332; 588/315, 412
See application file for complete search history.

(56) References Cited

U.S. PATENT DOCUMENTS

| | | | |
|---|---|---|---|
| RE26,585 E * | 5/1969 | Svanoe | 423/320 |
| 4,336,142 A * | 6/1982 | Bye | 210/724 |
| 5,074,916 A * | 12/1991 | Hench et al. | 106/35 |
| 5,849,567 A | 12/1998 | Fischer et al. | |
| 5,882,429 A | 3/1999 | Majid et al. | |
| 6,069,209 A | 5/2000 | Darling et al. | |
| 6,214,233 B1 | 4/2001 | Lewis, III | |
| 6,264,720 B1 | 7/2001 | Schowanek et al. | |
| 6,274,045 B1 | 8/2001 | Kreisler | |
| 2002/0111525 A1 * | 8/2002 | Pal et al. | 588/13 |
| 2003/0138369 A1 * | 7/2003 | Witham et al. | 423/331 |

* cited by examiner

Primary Examiner—David Sample
(74) Attorney, Agent, or Firm—William Parks; Carlos Nieves

(57) ABSTRACT

Methods for the removal of lead from a metal silicate during the process of manufacturing of such a material are provided. With the reliance upon lower cost starting silicon dioxide starting materials that are known to exhibit elevated amounts of heavy metal therein for the purpose of producing metal silicates (such as sodium silicate, as one example), it has been realized that removal of significant amounts of such heavy metals is necessary to comply with certain regulatory requirements in order to provide a finished material that exhibits the same low level of heavy metal contamination as compared with finished materials that are made from more expensive, purer starting silicon dioxides. Two general methods may be followed for such decontamination purposes. One entails the introduction of a calcium phosphate material, such as dicalcium phosphate, tricalcium phosphate, and/or hydroxyapatite, to a formed metal silicate solution but prior to filtering. The other requires the introduction of calcium phosphate material (again, hydroxyapatite, tricalcium phosphate, and/or dicalcium phosphate) in a silicon dioxide, caustic, and water slurry with said dicalcium phosphate thus present throughout the overall reaction steps of metal silicate formation and is removed by filtering. In each situation, the hydroxyapatite, tricalcium phosphate, or dicalcium phosphate actually aids in rendering immobile the heavy metals therein, such as lead, cadmium, and the like, thereby preventing release of high amounts of bioavailable amounts of such heavy metals from products for which the target metal silicates are considered reactants. Thus, the heavy metal-containing metal silicates may then be utilized to produce precipitated silicas, as one example, that exhibit much lower levels of bioavailable heavy metals as compared with the original silicon dioxide source.

10 Claims, No Drawings

METHOD OF REMOVING HEAVY METALS FROM SILICATE SOURCES DURING SILICATE MANUFACTURING

FIELD OF THE INVENTION

The present invention relates to methods for the removal of heavy metals from a metal silicate during the process of manufacturing of such a material. With the reliance upon lower cost silicon dioxide starting materials (known to exhibit elevated amounts of heavy metals therein) for the purpose of producing metal silicates (such as sodium silicate, as one example), it has been realized that removal of significant amounts of such heavy metals is necessary to comply with certain regulatory requirements in order to provide a finished material that exhibits the same low level of heavy metal contamination as compared with finished materials that are made from more expensive, purer starting silicon dioxides. Two general methods may be followed for such decontamination purposes. One entails the introduction of a calcium phosphate material, such as dicalcium phosphate, tricalcium phosphate, and/or hydroxyapatite, to a formed metal silicate solution but prior to filtering (the post-silicate method). The other requires the introduction of calcium phosphate material (again, hydroxyapatite, tricalcium phosphate, and/or dicalcium phosphate) in a silicon dioxide, caustic, and water slurry with said dicalcium phosphate thus present throughout the overall reaction steps of metal silicate formation and is removed by filtering (the pre-silicate method). In each situation, the hydroxyapatite, tricalcium phosphate, or dicalcium phosphate actually aids in rendering immobile the heavy metals therein, such as lead, cadmium, and the like, thereby preventing release of high amounts of such heavy metals from products for which the target metal silicates are considered as starting materials. Thus, the heavy metal-containing metal silicates may then be utilized to produce precipitated silicas, as one example, that exhibit much lower levels of heavy metals as compared with the original silicon dioxide source.

BACKGROUND OF THE INVENTION

Heavy metals, such as lead, arsenic, cadmium, copper, and zinc, exhibit differing levels of toxicity within mammals. Particularly when ingested and in a state that can be metabolized and absorbed in the body, i.e., when it is ingested in a bioavailable form, such metals exhibit a propensity for toxic effects, even in low amounts, and upon accumulation within the body. As a result, regulatory agencies at both the state and federal levels have enacted regulations in terms of the maximum amount of such heavy metals that are generally permitted within materials that have the potential for human consumption. Thus, it is important to develop methods for minimizing the amount of such heavy metals within materials that may be utilized and ingested by humans (and other mammals).

Included within such materials are spray- or flash-dried metal silicates, precipitated silicas, silica gels, silicates, and other products that are made from silicon dioxide sources. End use formulations include many different cleaning preparations, such as dentifrices, cosmetic compositions, such as body powders, and the like, and other like applications, such as anti-caking and/or free-flowing agents that necessarily require human consumption or food contact, such as paper, plastic and rubber fillers, and pharmaceutical excipients for proper utilization thereof. Such materials that form much of the basis of these end use formulations are produced from silicon dioxide sources of various levels of heavy metal contamination. The most expensive silicon dioxide sources are considered the most pure in terms of such levels of heavy metal presence and thus generally do not require any modification to reduce potential toxic effects that may result therefrom. However, as the necessity for lower costs for source materials increases, and/or the source of pure silicon dioxide materials becomes rarer, it has thus become important to provide some manner of reducing the amount of heavy metals present within either such starting materials or, more particularly, within intermediate materials produced therefrom.

Precipitated silicas are basically produced via the initial production of metal silicates (such as, without limitation, sodium silicate) and then exposing such a material to a mineral acid (sulfuric acid, as one example), and subsequently precipitating the resultant silica produced thereby. Metal silicates, such as calcium silicate and sodium aluminosilicate, can be produced via initial sodium silicate production and addition of a metal species, such as calcium hydroxide, and an acid species to the reaction mixture to produce for instance, calcium silicate. Silica gels may also be formed through reaction of sodium silicate with acid under different conditions. In essence, it has been realized that the ability to reduce the amount of heavy metals within such ultimate products may be addressed during one of the process steps for producing the needed metal silicate intermediate material.

There have been many discussions of technologies for the removal of heavy metals, most prominently lead, from various waste materials and soils, mainly due to contamination through lead leakage or disposal. Such treatments, which include various methods including, generally speaking, thermal, biological, and physical and/or chemical treatments, have proven relatively effective for waste materials (sludges) and contaminated grounds (soils); however, nothing has been presented within the prior art that concerns the ability to reduce levels of heavy metals within specific silicate products, and certainly not during a metal silicate production method. Such prior techniques generally require soil removal removing the contaminated soil, treating it, and either replacing it on-site or disposing of it away from the area of contamination. Further developments for such decontamination of soils and sludges have involved flushing of such soil and/or sludge materials with fluids for lead dissolution, followed by potentially complex processes including immobilization of the heavy metals, precipitation of the heavy metals in an insoluble form, degradation of the heavy metal-containing materials by chemical or biological techniques (such that the heavy metals are solubilized, followed by removal of the solubilized heavy metals), or attenuation of the heavy metals by addition of inert materials to the heavy metal-contaminated soil or waste. Again, these methods do not address the ability to treat silicon dioxide materials during a silicate-producing process, and, as alluded to above, are rather complex in the function.

Phosphate materials have been suggested as possible additives to remove certain heavy metals, such as lead, from aqueous solutions, but not from solid particles or during the formation of such solid particles. Therefore, although use of phosphate minerals for immobilizing lead has been suggested in the prior art, there has been no prior disclosure of a method for accomplishing immobilization of lead or other heavy metals from either formed silicate or within a slurry from which such silicate materials are formed using solid calcium phosphate-containing materials within a high pH range.

SUMMARY OF THE INVENTION

Accordingly, it is an advantage of the present invention to provide a relatively simple, yet significantly improved method of removing substantial amounts of undesirable heavy metal contaminates from metal silicate materials. It is an additional advantage of the invention to permit the utilization of readily available, inexpensive solid calcium phosphate containing materials, specifically hydroxyapatite and dicalcium phosphate, directly within a metal silicate forming process for the purpose of drastically reducing the amount of undesirable heavy metal contaminates therein.

Accordingly, the instant invention encompasses a method of producing a metal silicate material, comprising the steps of:
 a) providing a silicon dioxide source;
 b) reacting said silicon dioxide source with a caustic to form a metal silicate solution;
 c) introducing a calcium phosphate material selected from the group consisting of hydroxyapatite, dicalcium phosphate, tricalcium phosphate, and any mixtures thereof, to said formed metal silicate solution; and
 d) removing any resultant insoluble heavy metal complexes and/or salts from said metal silicate solution.

This invention also encompasses a method of producing a metal silicate material comprising the steps of:
 a) providing a silicon dioxide source;
 b) reacting said silicon dioxide source with a soda ash to form a solid metal silicate;
 c) dissolving solid metal silicate with water to form a metal silicate solution;
 d) introducing a calcium phosphate material selected from the group consisting of hydroxyapatite, dicalcium phosphate, tricalcium phosphate, and any mixtures thereof, to said formed metal silicate solution; and
 e) removing any resultant insoluble heavy metal complexes and/or salts from said metal silicate solution.

This invention also encompasses another method of producing a metal silicate material comprising the steps of
 a) providing a silicon dioxide source;
 b) mixing said silicon dioxide source with a caustic and water in order to form a slurry thereof;
 c) introducing a calcium phosphate material selected from the group consisting of hydroxyapatite, dicalcium phosphate, tricalcium phosphate, and any mixtures thereof, to said slurry; and
 d) allowing said resultant slurry of step "c" to form a metal silicate solution; and
 e) removing any resultant insoluble heavy metal complexes and/or salts from said resultant metal silicate solution.

Such methods are very selective in terms of the specific reactants required for effective heavy metal removal, as well as the specific introduction step of such materials therein. For the calcium phosphate post-silicate methods, such an additive must be introduced after silicate solution formation has at least been initiated, preferably, though not necessarily, subsequent to actual metal silicate production. It has been realized that the hydroxyapatite, tricalcium phosphate, and/or dicalcium phosphate (for this pre-silicate method, hydroxyapatite is preferred, however) effectively reacts with the heavy metal compounds (such as lead, for instance) to form insoluble complexes and/or salts that can then be relatively easily removed therefrom during, for instance, and without limitation, a filtration step for such insoluble compounds. Likewise, for the pre-silicate method, such an additive must be introduced during or directly after the reaction slurry of silicon dioxide and water has been formed. In this manner, it is believed that the preferred dicalcium phosphate (for this pre-silicate method) more easily reacts with the heavy metals present therein and effectively results in the formation of the same type of insoluble heavy metal complexes and/or salts that may ultimately be removed through relatively simple procedures. Importantly, it has been found, quite unexpectedly, that such specific reactions are unique in that introduction of dicalcium phosphate to an already formed metal silicate will not result in any noticeable reduction in heavy metal species from such a formed product. As well, addition of hydroxyapatite within the slurry stage of silicate formation is needed at a higher dosage level to provide any appreciable modification in heavy metal presence within the final metal silicate product. Thus, as alluded to, these specific methods are highly unexpected as the selection of additive during specific process steps provide the desired outcome.

DETAILED DESCRIPTION OF THE INVENTION

Commercially, alkali metal silicate solutions of $SiO_2$:$M_2O$ mole ratio of about 0.5 to about 4 are prepared by 2 methods: the hydrothermal reaction of quartz and a caustic, such as caustic soda, in the presence of water and the furnace method to make "waterglass" of reacting quartz and a carbonate, such as sodium carbonate. The alkali metal may be sodium, potassium or lithium, with sodium preferred. The quartz used is a finely ground sand, also known as silica flour.

In the hydrothermal method, sodium silicate with a $SiO_2$:$Na_2O$ mole ratio of 2.0 to about 2.70, preferably 2.4 to 2.7, and more preferably 2.5 to 2.65 was produced by heating, such as with a saturated steam or electrical heating, to about 148° C. (0.34 MPa) to about 216° C. (2.07 MPa), preferably from 170° C. (0.69 MPa) to 208° C. (1.72 MPa), and more preferably from 185° C. (1.03 MPa) to 198° C. (1.38 MPa), a stoichiometric amount of sand, caustic and water in an agitated pressure reactor is cooked from 2 to 6 hours, preferably from 3 to 5 hours. Unreacted sand is then separated from the formed sodium silicate solution by filtration, such as with a pressure leaf filter.

In the furnace method, waterglass having a $SiO_2$:$Na_2O$ mole ratio of 0.5 to about 4, preferably about 2.0 to 3.5 and more preferably 3.2 to 3.4, is produced by heating stoichiometric amounts of sand and soda ash ($Na_2CO_3$) to 1100° C. to about 1400° C. in an oil- or gas-fired open-hearth regenerative furnace or electric or plasma furnace. The formed glass is cooled, crushed and dissolved in batch atmospheric or pressure dissolvers or continuous atmospheric dissolver, preferably in a pressure dissolver using saturated steam (as the heating media) and water to dissolve the waterglass in the process ranges from 134° C. (0.2 MPa) to 215° C. (2 MPa), preferably from 165° C. (0.6 MPa) to 204° C. (1.6 MPa), and more preferably from 184° C. (1 MPa) to 192° C. (1.2 MPa). The solubilized silicate solution is then filtered by a pre-coat filter.

The level of contaminant metals present in the metal silicate solution is dependent upon the silicon dioxide (sand) source used to make the metal silicate solution. Typical contaminant metals of concern are lead (Pb), cadmium (Cd), copper (Cu), arsenic (As), and zinc (Zn). The amount of contaminant metal removed is dependent on the initial concentration present, the particular calcium phosphate treatment additive and amount used, and the treatment time and temperature.

One method of reducing the metal contaminant level in the metal silicate solution involves adding a calcium phosphate, such as hydroxyapatite, dicalcium phosphate, and tricalcium phosphate, preferably hydroxyapatite, to the formed silicate in an amount of 0.1% to 50%, based on the silicate weight, preferably 0.5% to 10%, and more preferably 1% to 5% and mixing and heating the slurry to about 50° C. to about 90° C., preferably about 60° C. to about 85° C. for about 15 min to about 300 min, preferably from 30 min to 120 min, and more preferably for about 30 to about 60 min. Thereafter, the calcium phosphate additive, which has the metal contaminants immobilized thereon, is removed from the metal silicate solution by filtration, centrifugation, or vibrating screening, preferably by filtration, such as with a pressure leaf filter. This method is useful to remove heavy metals from sodium silicate solution made by hydrothermal reaction or made by dissolving waterglass and of any concentration or mole ratio.

Another method of reducing the metal contaminant level in the silicate solution is by adding the calcium phosphate with the other reactants used to make the metal silicate. To make sodium silicate for instance, water and stoichiometric amounts of sand and caustic soda are added to a stirred hydrothermal reactor. The calcium phosphate, such as hydroxyapatite, dicalcium phosphate, and tricalcium phosphate, preferably dicalcium phosphate, is added to the reactor in an amount of about 0.1% to about 20%, preferably from about 0.5% to about 10%, and more preferably from about 1% to about 5% based on the weight of the sand used. The pressure reactor is heated to about 0.34 MPa to about 2.07 MPa, preferably 0.69 MPa to 1.72 MPa, and more preferably from 1.03 MPa to 1.38 MPa for about 2 to about 6 hours, preferably about 3 to about 5 hours. (Higher temperature/pressure provides higher mole ratio of sodium silicate.) Thereafter, the mixture is filtered to remove unreacted sand and the calcium phosphate additive, which has the metal contaminants immobilized thereon, by filtration, centrifugation, or vibrating screening, preferably by filtration, such as pressure leaf filtration.

The decontaminated silicate can be used as such, as an ingredient in finished formulations or as a raw material to prepare precipitated silica, silica gel, calcium silicate, magnesium silicate, sodium aluminosilicate, and the like, which meet food, cosmetic and pharmaceutical requirements for trace metal contaminant levels.

PREFERRED EMBODIMENTS OF THE INVENTION

Metal Determination Method—Post-Silicate Methods

Metal concentration was determined using a Perkin Elmer Elan DRC Plus ICP/MS. The sodium silicate sample was solubilized by heating 2 g of the silicate with about 10–12 ml hydrofluoric acid and about 5 ml nitric acid in a 50-ml platinum dish until completely dry, to remove the silica. Next, 5–7 ml of $HNO_3$ and about 25 ml of water was added and heated to dissolve the residue. The solution was quantitatively transferred to a 100-ml volumetric flask and filled to volume with deionized water. Then, 2.5 ml of this sample solution and internal standards added to compensate for transport conditions were diluted to 50 ml with water and aspirated into the ICP/MS. The metal concentrations in the sample were determined by comparing the sample response to metal standards of known concentration.

Example 1

Liquid sodium silicate having a concentration of 32.6%, a mole ratio of 2.68, and containing 0.95 ppm Pb was mixed with an equal weight of a 27.1% aqueous suspension of hydroxyapatite (HO252 Hydroxyapatite Type I available from Sigma-Aldrich, St. Louis, Mo.) for 1 hr at a temperature of about 160° F. (71° C.). Thereafter the solid particles of hydroxyapatite were separated from the sodium silicate by withdrawing a portion of the silicate mixture with a syringe (Becton Dickinson model 309585 and forcing the mixture through a 0.45 μm syringe filter (VWR 28145-481. The recovered, filtered sodium silicate was analyzed for Pb according to the method described above and found to contain 0.020 ppm Pb (20 ppb Pb), which was about a 50 times reduction in lead (Pb) concentration.

Example 2

In order to determine the treatment time necessary to maximize the amount of lead removed from sodium silicate, aliquots of the treated sodium silicate were withdrawn at intervals and analyzed for lead concentration. To a Teflon beaker, was added 100 g of sodium silicate solution (32.6%, 2.68 mole ratio, 0.95 ppm Pb) and 1 g of H0252 Hydroxyapatite suspension available from Sigma Aldrich, St. Louis, Mo. The mixture was agitated with a magnetic stir bar and heated to 60° C. on a hot plate. Samples were withdrawn from the beaker at 5, 15, 30, 60, 120, 240 minutes, utilizing a syringe filter (0.45 μm filter) to separate the solid material (hydroxyapatite) from the sodium silicate solution. The sodium silicate solution was subsequently analyzed according to the method described above for lead, calcium and aluminum concentration. Results are summarized below in Table 1.

TABLE 1

| Time Min | Lead ppm | Calcium Ppm | Alumina ppm |
|---|---|---|---|
| 0 | 0.95 | 16 | 553 |
| 5 | 0.72 | 38 | 575 |
| 15 | 0.61 | 22 | 526 |
| 30 | 0.58 | 19 | 472 |
| 60 | 0.50 | 17 | 503 |
| 120 | 0.51 | 25 | 599 |
| 240 | 0.49 | 20 | — |

As shown in Table 1, 1% hydroxyapatite was very effective in reducing trace lead levels in the liquid silicate, while not affecting the calcium and aluminum levels. The lead concentration drops continually for the first hour to about 50% of the initial concentration and then levels off. The calcium and alumina levels are scattered around the mean of 22 ppm for calcium and 538 ppm for alumina.

Example 3

In this example, several different phosphates (several solid hydroxyapatites, natural apatite, dicalcium phosphate and tricalcium phosphate) were substituted for the hydroxyapatite suspension used in Examples 1–2. The same treatment procedure used in Example 2 was followed, except the treatment levels of the various phosphates were 1% and 3% based on the sodium silicate. The sodium silicate (32.6%, 2.68 mole ratio) and phosphate were mixed together for 1 hr at 60° C. The samples were analyzed according to the method described above and the initial and after-treatment lead concentration [Pb] is given in Table 2

TABLE 2

| Phosphate | Initial Silicate [Pb], ppm | 1% dosage ppm Pb | % Reduction | 3% dosage ppm Pb | % Reduction |
|---|---|---|---|---|---|
| C93-15 | 0.80 | 0.42 | 48 | 0.20 | 75 |
| GFS | 0.80 | 0.51 | 36 | 0.27 | 66 |
| C53-83 MF | 0.81 | 0.47 | 42 | — | — |
| Natural Apatite | 1.0 | 0.88 | 12 | 0.80 | 20 |
| DCP | 0.81 | 0.77 | 4 | 0.72 | 10 |
| TCP | 0.81 | 0.60 | 26 | — | — |

C93-15 and C53-83MF are grades of pentacalcium hydroxyorthophosphate, $Ca_5(PO_4)_3OH$ referred to herein as hydroxyapatite, available from Gallard-Schlesinger Industries, Plainview, N.Y.; GFS is a pentacalcium hydroxyorthophosphate, $Ca_5(PO_4)_3OH$ referred to herein as hydroxyapatite, available from GFS Chemicals, Powell, Ohio; Natural Apatite is a natural hydroxyapatite derived from fish bones available from UFA Ventures, Carlsbad, N. Mex.; DCP is dicalcium phosphate, $CaHPO_4$ available from Rhodia Corporation, Cranbury, N.J.; and TCP is tricalcium phosphate, $Ca_3(PO4)_2$, available from Gallard-Schlesinger Industries, Plainview, N.Y.

The synthetic hydroxyapatite samples reduced the Pb content of the sodium silicate by about 40% at a 1% treatment level and by about 70% at a 3% treatment level and tricalcium phosphate was nearly as effective.

Example 4

In example 4, 100 g of 32.6% sodium silicate having a 2.65 mole ratio was heated on a hot plate to between 71–82° C. in a Teflon beaker as control and then added 1 g of hydroxyapatite for sample testing. In Example 4A, several metals were also intentionally spiked into 150 g of 32.6% sodium silicate having a 2.65 mole ratio by pipetting 0.25 mg each of Pb, Cd, and Cu into the sodium silicate solution as control and then added 1% of hydroxyapatite for sample testing. The mixture was agitated with a magnetic stir bar and allowed to react for 1 hour. Samples were withdrawn from the beaker utilizing a syringe filter (0.45 μm filter) to separate the solid material (hydroxyapatite) from the sodium silicate solution.

Additionally, a control was made and tested with Control 4 being a portion of the sodium silicate used for Example 4 with no hydroxyapatite added.

The sodium silicate solutions were subsequently analyzed according to the method described above for lead, cadmium, copper and zinc and the results are summarized in Table 3 below.

TABLE 3

| Example | Pb, ppb | Cd, ppb | Cu, ppb | Zn, ppb |
|---|---|---|---|---|
| Control 4 | 879 | 24 | 627 | 1601 |
| 4 | 548 | 6 | 274 | 718 |
| % reduction | 38% | 75% | 56% | 55% |
| Control 4A | 2465 | 1666 | 1843 | — |
| 4A | 1393 | 515 | 1129 | — |
| % reduction | 43% | 69% | 39% | — |

It is evident from the results given that hydroxyapatite is very effective in reducing contamination of several metals. The treatment of a 2.65 molar ratio sodium silicate with 1% hydroxyapatite was also very effective in reducing higher metal contamination levels from a less pure (higher metal) sodium silicate solution, represented by the spiked samples of Example 4A.

Example 5–6

In Example 5, 100 g of 37.5% sodium silicate having a molar ratio of 3.2 was heated on a hot plate to between 71–82° C. in a Teflon beaker as control and then added 1 g of hydroxyapatite for sample testing. In Example 6, several metals were also intentionally spiked into 150 g of 32.6% sodium silicate having a 2.65 mole ratio by pipetting 0.25 mg each of Pb, As, Cd, Cu and Zn into the sodium silicate solution as control and then added 1% of hydroxyapatite for sample testing. The mixture was agitated with a magnetic stir bar and allowed to react for 1 hour. Samples were withdrawn from the beaker utilizing a syringe filter (0.45 μm filter) to separate the solid material (hydroxyapatite) from the sodium silicate solution.

Additionally, controls were made and tested with Control 5 being a portion of the sodium silicate used for Example 5 with no hydroxyapatite added and Control 6 being a portion of the sodium silicate used for Example 6 with no hydroxyapatite added.

The sodium silicate solutions were subsequently analyzed according to the method described above for lead, arsenic, cadmium, copper and zinc and the results are summarized in Table 3 below.

TABLE 4

| Example | Pb, Ppb | As, ppb | Cd, ppb | Cu, ppb | Zn, ppb |
|---|---|---|---|---|---|
| Control 5 | 330 | 106 | 74 | 379 | 1892 |
| 5 | 213 | 94 | 65 | 201 | 1588 |
| % Reduction | 35% | 11% | 12% | 47% | 16% |
| Control 6 | 2063 | 730 | 1726 | 2127 | 2861 |
| 6 | 943 | 431 | 428 | 902 | 2345 |
| % Reduction | 54% | 41% | 75% | 58% | 18% |

The treatment of a 3.2 molar ratio sodium silicate with 1% hydroxyapatite was very effective in reducing the metal contamination levels. The spiked samples show that hydroxyapatite was even more effective in reducing the metals concentration from a less pure (higher metal) sodium silicate solution.

Metal Determination Method—Pre-Silicate Methods

Metal concentration was determined using a Perkin Elmer Elan DRC Plus ICP/MS. The sodium silicate sample was solubilized by heating 2 g of the silicate with about 10–12 ml hydrofluoric acid and about 5 ml nitric acid in a 50-ml platinum dish until completely dry, removing the silica. Next, 5–7 ml of $HNO_3$ and about 25 ml of water was added and heated to dissolve the residue. The solution was quantitatively transferred to a 100-ml volumetric flask and filled to volume with deionized water. Then, 2.5 ml of this sample solution and internal standards added to compensate for transport conditions were diluted to 50 ml with water and aspirated into the ICP/MS. The metal concentrations in the sample were determined by comparing the sample response to metal standards of known concentration.

Examples 7–10

A method of reducing the lead level in sodium silicate was to add dicalcium phosphate (DCP) to the hydrothermal reactor with the ingredients used to make sodium silicate: silica flour and caustic soda (NaOH). Into a 2 liter stirred Parr reactor was added 468 g silica flour (finely ground sand), 442 g of 50% NaOH solution, the specified amount of dicalcium phosphate (control has no dicalcium phosphate added) and 577 g of deionized water. (The silica flour starting material contained 4.19 ppm Pb and the dicalcium phosphate contained 0.019 ppm Pb.) The reactor is heated to 1.38 MPa (about 198° C.) with the agitation speed set to the maximum. After the reaction mass reached 1.38 MPa (about 90 min), the reaction was allowed to cook for 4 hrs. The resultant 2.65 molar ratio sodium silicate (2.65 mole $SiO_2$:1 mole $Na_2O$) was filtered on a Buchner funnel to remove the particles of dicalcium phosphate and unreacted sand. The filtered sodium silicate samples were analyzed according the method described above to determine lead (Pb) content.

TABLE 1

| Example | DCP g | % DCP Dosage | Pb in Silicate ppm | % Reduction |
|---|---|---|---|---|
| 7 | 1.17 | 0.25 | 0.756 | 0 |
| 8 | 4.68 | 1.00 | 0.731 | 3.3 |
| 9 | 14.0 | 3.00 | 0.570 | 24.6 |
| 10 | 23.4 | 5.00 | 0.264 | 65.0 |
| Control | 0 | 0 | 0.756 | — |

The dicalcium phosphate (DCP) is available from Rhodia Corporation, Cranbury, N.J.

Example 11–13

In these examples, sodium silicate was prepared from sand and caustic soda as in Example 1. For Examples 11 and 12, dicalcium phosphate (DCP) was additionally added to the reaction ingredients and for Example 13, hydroxyapatite, (HA) was added, whereas the controls contained no calcium phosphate. Control 11 sample was a sodium silicate control with no additional metals (spike) added. Example 12 and Control 12 were each spiked with 2 mg each of lead, cadmium and copper. Where spikes are indicated in the Table 2, two ml of 1000 ppm Pb, 2 ml 1000 ppm Cd, and 2 ml 1000 ppm Cu were added to the reactor with the other ingredients. The amount of ingredients used is given is Table 2.

TABLE 2

| Example | 50% NaOH G | Sand g | Water g | DCP g | HA g | Spike |
|---|---|---|---|---|---|---|
| 11 | 442 | 468 | 577 | 23.4 | 0 | No |
| Control 11 | 442 | 468 | 577 | 0 | 0 | No |
| 12 | 442 | 468 | 577 | 23.4 | 0 | Yes |
| Control 12 | 442 | 468 | 577 | 0 | 0 | Yes |
| 13 | 442 | 468 | 577 | 0 | 23.4 | No |

The sodium silicates produced above were diluted 2:1 with deionized water, i.e. 200 g silicate diluted with 100 g deionized water. The silicates were then vacuum filtered using a GF/B glass fiber filter and then analyzed for trace metal content according to the metal determination method described above. The results are summarized below in Table 3.

TABLE 3

| Example | Pb ppb | Cd ppb | Cu ppb |
|---|---|---|---|
| Control 11 | 791 | 14 | 374 |
| 11 | 497 | 6 | 358 |
| 11 % Reduction | 37 | 57 | 4.3 |
| Control 12 | 1531 | 666 | 1406 |
| 12 | 1009 | 126 | 573 |
| 12 % Reduction | 34 | 81 | 59 |
| 13 | 476 | 17 | 181 |
| 13 % Reduction | 40 | — | 52 |

A 5% treatment level of dicalcium phosphate (Ex. 11) was able to reduce the lead concentration in the sodium silicate solution by 37%, the cadmium concentration by 57% and the copper concentration by about 4%. A 5% treatment level of hydroxyapatite (Ex. 13) was able to reduce the lead concentration in the sodium silicate by 34% and the copper by 52%. The spiked samples show that a 5% treatment level of dicalcium phosphate (Ex. 12) was effective in reducing the cadmium and copper concentration in a sodium silicate containing higher contaminant levels by 81% and 59%, respectively.

The preceding examples are set forth to illustrate the principles of the invention, and specific embodiments of operation of the invention. The examples are not intended to limit the scope of the method. Additional embodiments and advantages within the scope of the claimed invention will be apparent to one of ordinary skill in the art.

What is claimed is:

1. A method of producing a metal silicate material comprising the steps of:
   a) providing a silicon dioxide source;
   b) mixing said silicon dioxide source with an acid and water in order to form a slurry thereof;
   c) introducing a calcium phosphate material selected from the group consisting of hydroxyapatite, dicalcium phosphate, tricalcium phosphate, and any mixtures thereof, within said slurry of step "b";
   d) allowing said resultant slurry of step "c" to form a metal silicate; and
   e) removing any resultant insoluble heavy metal complexes and/or salts from said resultant metal silicate solution.

2. The method of claim 1 wherein said metal silicate is selected from the group consisting of silicon dioxide, sodium silicate, calcium silicate, magnesium silicate, sodium aluminosilicate and sodium magnesium aluminosilicate.

3. The method of claim 1 wherein said calcium phosphate material is introduced to said formed metal silicate solution in an amount from 0.1 to 20% by weight of the silicon dioxide.

4. The method of claim 3 wherein said metal silicate is selected from the group consisting of s silicon dioxide, sodium silicate, calcium silicate, magnesium silicate, sodium aluminosilicate and sodium magnesium aluminosilicate.

5. The method of claim 1 wherein said calcium phosphate material is dicalcium phosphate.

6. The method of claim 5 wherein said metal silicate is selected from the group consisting of silicon dioxide, sodium silicate, calcium silicate, magnesium silicate, sodium aluminosilicate and sodium magnesium aluminosilicate.

7. The method of claim 5 wherein said dicalcium phosphate is introduced to said formed metal silicate solution in an amount from 0.1 to 20% by weight of the silicon dioxide.

8. The method of claim 7 wherein said metal silicate is selected from the group consisting of silicon dioxide, sodium silicate, calcium silicate, magnesium silicate, sodium aluminosilicate and sodium magnesium aluminosilicate.

9. The method of claim 7 wherein said dicalcium phosphate is introduced to said formed metal silicate solution in an amount from 3 to about 10% by weight of the silicon dioxide.

10. The method of claim 9 wherein said metal silicate is selected from the group consisting of silicon dioxide, sodium silicate, calcium silicate, magnesium silicate, sodium aluminosilicate and sodium magnesium aluminosilicate.

* * * * *